United States Patent
Krichever et al.

(10) Patent No.: US 9,296,038 B2
(45) Date of Patent: Mar. 29, 2016

(54) METHOD AND APPARATUS FOR SWAGED LIQUID INJECTOR SPOKE

(75) Inventors: Alexander Ilich Krichever, Carlsbad, CA (US); Mario Eugene Abreu, Poway, CA (US); Norm Turoff, Poway, CA (US); John Frederick Lockyer, San Diego, CA (US); Christopher Zdzislaw Twardochleb, Alpine, CA (US); David Marc Stansel, Chula Vista, CA (US)

(73) Assignee: Solar Turbines Incorporated, San Diego, CA (US)

( * ) Notice: Subject to any disclaimer, the term of this patent is extended or adjusted under 35 U.S.C. 154(b) by 829 days.

(21) Appl. No.: 13/560,192

(22) Filed: Jul. 27, 2012

(65) Prior Publication Data
US 2013/0168472 A1 Jul. 4, 2013

Related U.S. Application Data

(60) Provisional application No. 61/581,539, filed on Dec. 29, 2011.

(51) Int. Cl.
| | |
|---|---|
| *F23R 3/20* | (2006.01) |
| *F23R 3/28* | (2006.01) |
| *F23R 3/34* | (2006.01) |
| *F02C 7/22* | (2006.01) |
| *F23R 3/14* | (2006.01) |
| *B21K 25/00* | (2006.01) |

(52) U.S. Cl.
CPC . *B21K 25/00* (2013.01); *F23R 3/14* (2013.01); *F23R 3/283* (2013.01); *F23R 3/286* (2013.01); *F02C 7/22* (2013.01); *F23R 2900/00005* (2013.01); *F23R 2900/00017* (2013.01)

(58) Field of Classification Search
CPC ............... F23R 3/14; F23R 3/20; F23R 3/28; F23R 3/283; F23R 3/286; F23R 3/343; F02C 7/222
See application file for complete search history.

(56) References Cited

U.S. PATENT DOCUMENTS

| | | | | |
|---|---|---|---|---|
| 4,028,888 | A | * | 6/1977 | Pilarczyk .......................... 60/798 |
| 5,467,926 | A | | 11/1995 | Idleman et al. |
| 5,613,363 | A | | 3/1997 | Joshi et al. |
| 5,680,765 | A | | 10/1997 | Choi et al. |
| 5,850,731 | A | * | 12/1998 | Beebe et al. ..................... 60/778 |
| 6,070,410 | A | | 6/2000 | Dean |
| 6,238,206 | B1 | | 5/2001 | Cummings, III et al. |
| 6,763,663 | B2 | | 7/2004 | Mansour et al. |
| 6,868,676 | B1 | * | 3/2005 | Haynes .......................... 60/776 |
| 2007/0074571 | A1 | | 4/2007 | Rogers et al. |
| 2009/0084082 | A1 | * | 4/2009 | Martin et al. .............. 60/39.281 |

(Continued)

FOREIGN PATENT DOCUMENTS

| | | |
|---|---|---|
| CN | 101278152 | 10/2008 |
| EP | 0911583 | 4/1999 |

(Continued)

*Primary Examiner* — Darren W Gorman
(74) *Attorney, Agent, or Firm* — Finnegan, Henderson, Farabow, Garrett & Dunner, LLP

(57) ABSTRACT

A liquid fuel injection spoke for a gas turbine engine. The liquid fuel injection spoke may include an inlet end and an outlet end. The liquid fuel injection spoke may further include a head located at the inlet end and a stem extending along a longitudinal axis from the head to the outlet end. The stem may define a fluid passageway therein. The head may include a cavity with an inner wall. The inner wall may include an annular protrusion.

14 Claims, 4 Drawing Sheets

(56) References Cited

U.S. PATENT DOCUMENTS

| | | |
|---|---|---|
| 2010/0154424 A1 | 6/2010 | Twardochleb et al. |
| 2011/0027732 A1 | 2/2011 | Schiessel et al. |

FOREIGN PATENT DOCUMENTS

| | | |
|---|---|---|
| EP | 2282115 | 2/2011 |
| JP | 2005201613 | 7/2005 |

* cited by examiner

US 9,296,038 B2

METHOD AND APPARATUS FOR SWAGED LIQUID INJECTOR SPOKE

CLAIM FOR PRIORITY

This application claims benefit of priority from U.S. Provisional Application No. 61/581,539, filed Dec. 29, 2011, which is incorporated herein by reference.

TECHNICAL FIELD

The present disclosure relates generally to a fuel injector, and more particularly, to a joint for a fuel injector spoke.

BACKGROUND

Gas turbine engines (GTEs) produce power by extracting energy from a flow of hot gas produced by combustion of fuel in a stream of compressed air. In general, GTEs have an upstream air compressor coupled to a downstream turbine with a combustion chamber (combustor) in between. Energy is produced when a mixture of compressed air and fuel is burned in the combustor, and the resulting hot gases are used to spin blades of a turbine. In typical GTEs, multiple fuel injectors direct the fuel to the combustor for combustion.

The GTE may commonly include a swirler vane adapted to impart a swirl to compressed air passing through the GTE. The swirler may include a liquid fuel injection spoke. The liquid fuel injection spoke may be joined to, and in fluid communication with, a liquid fuel manifold. As such, the liquid fuel injection spoke may be configured to inject liquid fuel into the compressed air stream flowing past the swirler.

U.S. Pat. No. 5,613,363 to Joshi et al. ('363 patent) discloses an air fuel mixer having a mixing duct, a set of swirlers, and a means for injecting fuel into the mixing duct. As shown in FIG. 8, a plurality of spokes may be in communication with a fuel manifold such that the spokes may inject fuel into the mixing duct. Relevant to this disclosure, the '363 patent fails to disclose a means of engagement between the plurality of spokes and the fuel manifold.

SUMMARY

Embodiments of the present disclosure may be directed to a liquid fuel injection spoke for a gas turbine engine. The liquid fuel injection spoke may include an inlet end and an outlet end. The liquid fuel injection spoke may further include a head located at the inlet end and a stem extending along a longitudinal axis from the head to the outlet end. The stem may include a fluid passageway therein. The head may include a cavity with an inner wall. The cavity may form an inlet to the fluid passageway. The inner wall may include an annular protrusion.

Further embodiments of the present disclosure may be directed to a fuel injector system. The fuel injector system may include a liquid fuel injection spoke defining a fluid passageway therethrough. The liquid fuel injection spoke may include an inlet end, an outlet end, and a stem extending to the outlet end. The liquid injection spoke may further include a head located at the inlet end.

Still further embodiments of the present disclosure may be directed to a method of forming a joint in a turbine engine. The method may include inserting a liquid fuel injection spoke into an engine having a manifold. The method may further include applying a first deformation member to the liquid fuel injection spoke to deform the liquid fuel injection spoke. Additionally, the method may include materially bonding the liquid fuel injection spoke to the manifold via molecular diffusion.

DETAILED DESCRIPTION

Figure 1:
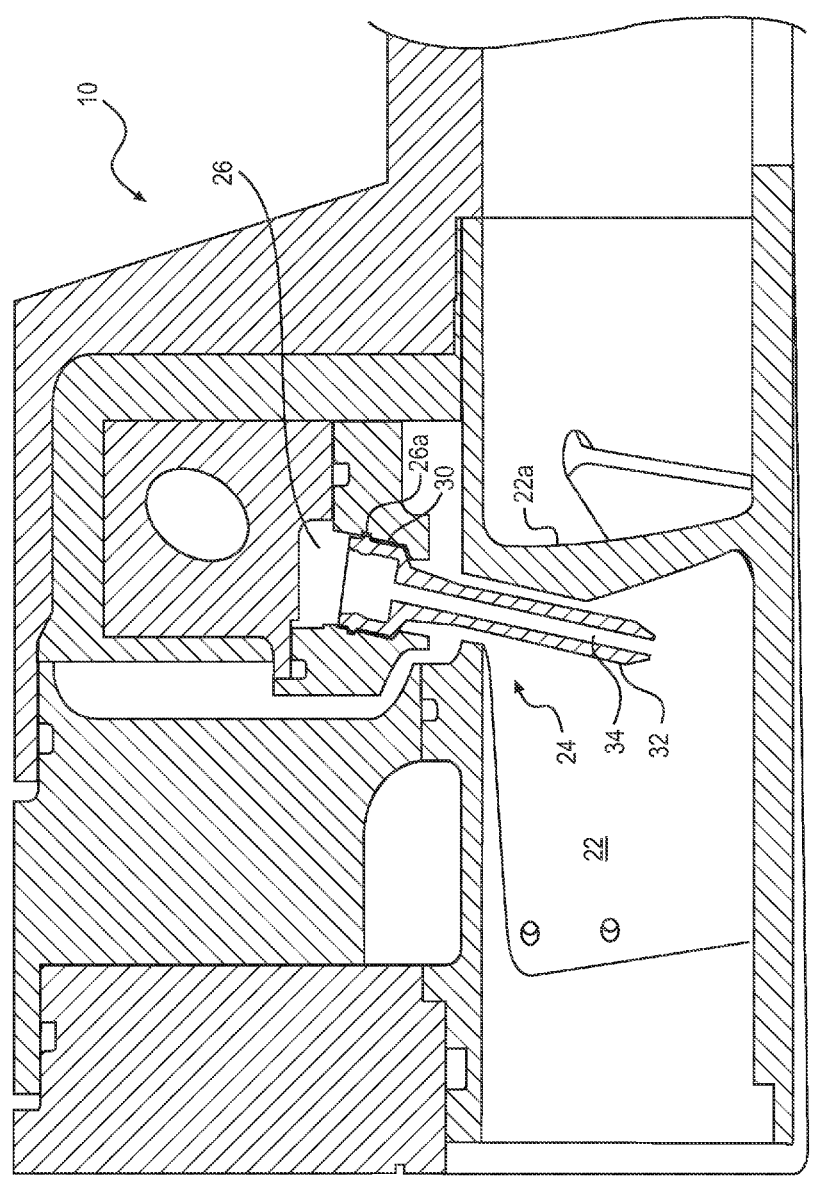
FIG. 1 is a cross-sectional illustration of an exemplary liquid fuel injection spoke in an exemplary liquid manifold of a fuel injector system.

FIG. 1 illustrates an exemplary liquid fuel injection spoke 24 in an exemplary liquid manifold 26 of a fuel injector system 10 of a GTE. Fuel injector 10 may be configured to deliver fuel to the GTE. GTE may include a first portion (not shown) configured to receive compressed air from a compressor section of the GTE and a second portion (not shown) configured to deliver premixed compressed air and fuel to a combustor of the GTE.

As shown in FIG. 1, a swirler 22 may be disposed within GTE between the first portion and the second portion. Swirler 22 may be configured to impart a swirl to compressed air delivered from the compressor of the GTE through first portion. Swirler 22 may include one or more liquid fuel injection spokes 24 fluidly connected to a liquid fuel manifold 26. Liquid fuel injection spoke(s) 24 may be formed of any suitable material configured to withstand high temperatures. Manifold 26 may be made of any suitable manifold material such as. Liquid fuel injection spoke 24 may be configured to spray a stream of liquid fuel from manifold 26 into the swirled compressed air stream flowing past swirler 22.

As shown in FIG. 1, liquid fuel injection spoke 24 may include an enlarged head 30 and a stem 32 defining a fluid passageway 34 therethrough. Head 30 may be positioned within manifold 26 and configured to receive liquid fuel from manifold 26. As shown, manifold 26 may include a manifold recess 26a configured to aid bonding between manifold 26 and head 30 as will be described in more detail below. Stem 32, as shown in FIG. 1, may extend radially inwardly into swirler 22. Swirler 22 may include a plurality of swirler vanes 22a extending radially inwardly. Stem 32 may be disposed in between any two of the plurality of swirler vanes 22a.

Figure 2:
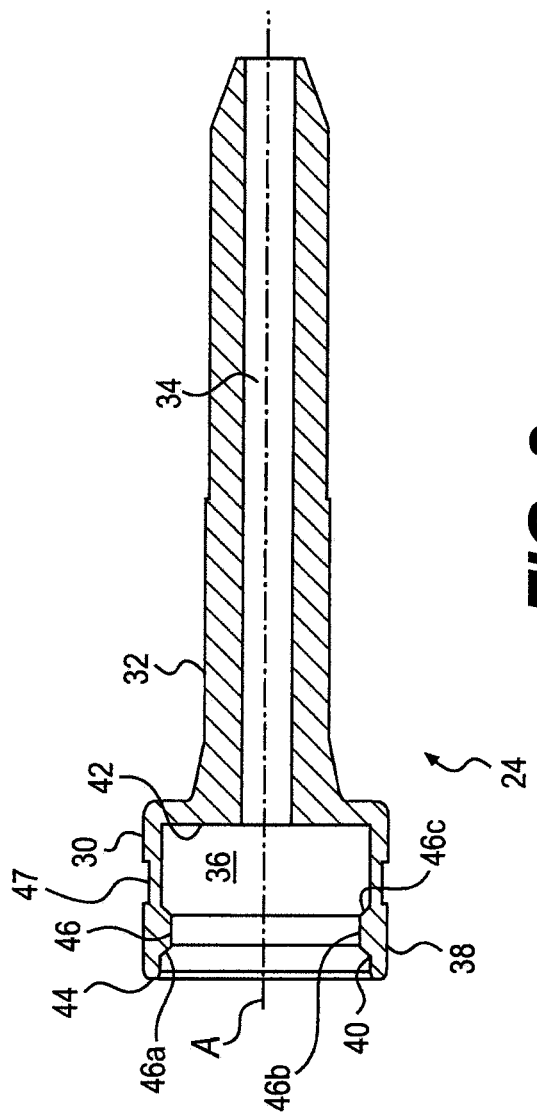
FIG. 2 is a cross-sectional view of the liquid fuel injection spoke of FIG. 2.

FIG. 2 illustrates an exemplary liquid fuel injection spoke 24 according to embodiments of the disclosure. Liquid fuel injection spoke 24, including fluid passageway 34, may extend along a central longitudinally extending axis A. Head 30 may include a fluid receiving cavity 36 configured to receive liquid fuel from manifold 26. Cavity 36 is in direct fluid communication with fluid passageway 34 extending along axis A through stem 32. As such, liquid fuel may be communicated from manifold 26, through cavity 36 of head 30, into fluid passageway 34 along stem 32, and into swirler 22 of the GTE.

Figure 3:
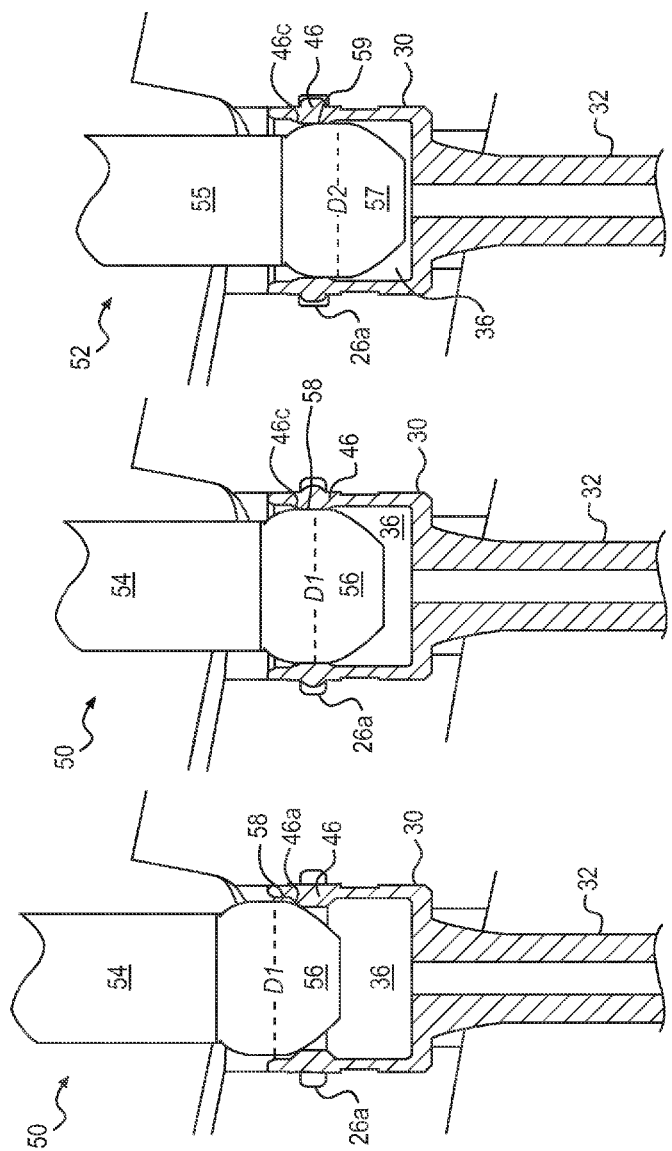
FIGS. 3A-3C are cross-sectional views of the liquid fuel injection spoke and a swager.

Head 30 may be deformable from a pre-installation configuration, as shown in FIG. 2, to a post-installation configuration as shown in FIGS. 1 and 3c as explained below. While in the pre-installation configuration, head 30 may include an outer circumferential wall 38 and an inner circumferential wall 40. A distance between outer circumferential wall 38 and inner circumferential wall may define a nominal thickness of head 30. Additionally, head 30 may include an inner end wall 42 and an upper end 44. Cavity 36 may be defined in part by inner circumferential wall 40, inner end wall 42, and upper end 44.

Inner circumferential wall 40 may further include a protrusion 46. Protrusion 46 may extend radially inwardly on inner circumferential wall 40 towards axis A. As shown in FIG. 2, the thickness of head 30 is increased in the area adjacent protrusion 46. Protrusion 46 may be located along inner circumferential wall 40 between inner end wall 42 and upper end 44. Further, protrusion 46 may include a swager contacting surface 46a. As shown in FIG. 2, for example, surface 46a may be inclined so as to cooperate with first and second swagers 50 and 52 (shown in FIGS. 3a-3c) to deform head 30 from the pre-installation configuration to the post-installation configuration. Alternatively, surface 46a may include any shape configured to contact and cooperate with first and second swagers 50 and 52.

As shown in FIG. 2, head 30 is of varying thickness. That is, head 30 may have a first thickness adjacent upper end 44. As shown, inner circumferential wall 40 includes a first taper portion adjacent upper end 44. Moving along inner circumferential wall 40 towards inner end wall 42, surface 46a is angled, i.e., tapered radially inward toward axis A. That is, the thickness of head 30 increases at surface 46a. Following surface 46a, a plateau or flat section 46b of protrusion 46 extends thereby maintaining a constant thickness of head 30 in the area of protrusion 46. The protrusion further includes a second angled, i.e., tapered surface 46c mirroring surface 46a. As shown in FIG. 2, the second surface 46c tapers radially outwardly away from axis A. That is, head 30 includes a reduced thickness in the area of the second surface 46c. Outer circumferential wall 38 includes a recess 47 therein. Recess 47 reduces the thickness of head 30 in the vicinity thereof. Recess 47 may be configured to receive a seal and/or gasket therein.

Deformation of head 30 from the pre-installation configuration to the post-installation configuration will be described in more detail with reference to FIGS. 3A-3C. As shown in FIG. 3A, liquid fuel injection spoke 24 may be positioned such that head 30 is disposed within manifold 26 with protrusion 46 adjacent to manifold recess 26a. Further, stem 32 may be positioned so as to extend into swirler 22. In order to couple liquid fuel injection spoke 24 within manifold 26, a series of first and second swagers 50 and 52 may be introduced into cavity 36 through the application of a pressing machine (not shown). For example, as shown in FIG. 3A, first swager 50 may be introduced into cavity 36. First swager 50 may include a longitudinally extending support 54. Swager die 56 may be disposed on an end of support 54. Swager die 56 may have any shape configured to interact with surface 46a so as to cause deformation of head 30. For example, swager die 56 may include a semi-spherical shape having an outer diameter D1. Upon insertion of swager 50 into cavity 36, an engagement portion 58, i.e. an outer side wall of swager die 56 may be brought into contact with surface 46a of protrusion 46.

Upon application of sufficient force urging first swager 50 into cavity 36, engagement portion 58 may cooperate with surface 46a so as to deform head 30. As shown in FIG. 3B, for example, engagement portion 58 may interact with surface 46a so as to progressively deform or displace material of protrusion 46 as semi-spherical swager die 56 is advanced. Indeed, as die 56 is advanced, a diameter of semi-spherical swager die 56 in contact with surface 46a is increased until it reaches outer diameter D1. As the diameter of die 56 is increased, increased force is applied to surface 46a so as to increase an amount of deformation or material displacement.

After a first degree of deformation or material displacement has been achieved through the use of first swager 50, second swager 52 may be inserted to cavity 36. Second swager 52 may be similar to swager 50, except a die 57 of swager 52 may include an outer diameter D2, larger than diameter D1 of die 56. That is, second swager 52, similarly to first swager 50, may include a longitudinally extending support 55 and a swager die 57 disposed on an end of support 55. Swager die 57 may have any shape configured to interact with surface 46a so as to cause deformation of head 30. For example, swager die 57 may include a semi-spherical shape having outer diameter D2. Upon insertion of second swager 52 into cavity 36, an engagement portion 59, i.e. an outer side wall of swager die 56 may be brought into contact with surface 46a.

Upon application of sufficient force urging second swager 52 into cavity 36, engagement portion 59 may cooperate with surface 46a so as to deform head 30. As shown in FIG. 3C, for example, engagement portion 59 may interact with surface 46a so as to progressively deform or displace the material of protrusion 46 as semi-spherical swager die 57 is advanced. Indeed, as die 57 is advanced, a diameter of semi-spherical swager die 57 in contact with surface 46a is increased until it reaches outer diameter D2. As the diameter of die 57 is increased, increased force is applied to surface 46a so as to increase an amount of deformation. As shown in FIG. 3C, second swager 52 may urge displaced material of protrusion 46 into recess 26a of manifold 26. That is, due to the interaction of first and second swagers 50 and 52 with head 30, material of protrusion 46 may be displaced from the pre-installation configuration in which protrusion 46 extends radially inwardly from inner circumferential wall 40 to the post-installation configuration in which displaced material of protrusion 46 may be urged outwardly of outer circumferential wall 38 and into recess 26a of manifold 26. As such, liquid fuel injection spoke 24 may be securely retained in manifold 26.

Engagement of liquid fuel injection spoke 24 with manifold 26 via first and second swagers 50 and 52 may form an improved joint therebetween. For example, displacement of material of protrusion 44 into recess 26a may provide an improved structural seal between liquid fuel injection spoke 24 and manifold 26. As such, leakage between manifold 26 and liquid fuel injection spoke 24 may be avoided. In addition, deformation of head 30 via first and second swagers 50 and 52 may ensure sealing without over stressing. That is, deformation of head 30 may be achieved sufficiently gradually so as to avoid stress cracking.

Further, as material of protrusion 46 is displaced, molecular diffusion between liquid fuel injection spoke 24 and manifold 26 may form an improved joint. Molecular diffusion is a solid-state welding technique which firmly joins two components. During molecular diffusion, contacting surfaces coalesce upon the application of heat and pressure. That is, owing to a gradient difference between two different materials, molecules of a region of higher concentration will migrate towards one of lower concentration. As such, a strong bond between manifold 26 and liquid fuel injection spoke 24 may be formed. Additionally, as to opposed to alternative prior art joining methods, molecular diffusion does not require application of a separate material and does not result in welding material interfering with fluid passageway 34.

INDUSTRIAL APPLICABILITY

Current liquid fuel injection spokes are expensive to manufacture and often produce unreliable results. For example, current spokes often allow leakage of fuel between the liquid fuel manifold and the liquid fuel injection spoke. Leakage may result in uneven fuel burning thereby resulting in uneven temperature distributions during combustion. Often, liquid fuel injection spokes are press-fit into engagement with the liquid fuel manifold. A press-fit engagement, however, requires precise manufacturing tolerances which increase manufacturing costs. Also, since there is no material bond, a press-fit engagement fails to prevent fuel leakage between the liquid fuel injection spoke and the liquid fuel manifold. Alternative engagements between the liquid fuel manifold and liquid fuel injection spoke may be obtained through brazing. Brazing, however, may result in particles of brazing material becoming lodged within a fuel passage of the liquid fuel injection spoke. This brazing material may reduce the cross-sectional area of the fuel passage and therefore, affect the amount and/or speed of liquid fuel injected through the liquid fuel injection spoke. Additionally, brazing is difficult to control and may result in uneven engagement between the liquid fuel injection spoke and liquid manifold.

Further engagements between the liquid fuel injection spoke and the liquid manifold may be accomplished via electron beam welding or laser welding in which materials are heated until they are melted and joined together. Each of these engagements, however, may produce stress cracking and is difficult to control with sufficient precision on elements having dimensions similar to common liquid fuel injection spokes. Additionally, welding may be ineffective to join the liquid fuel injection spoke and liquid manifold since each are commonly formed of a different material having different melting points.

Figure 4:
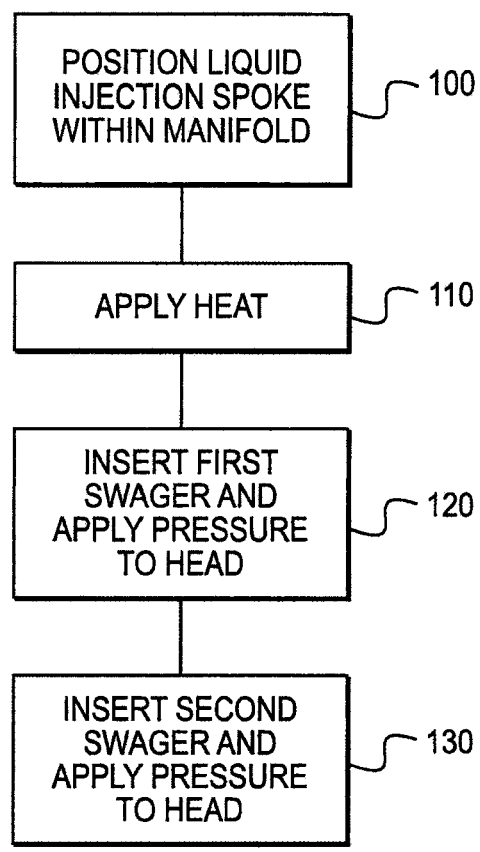
FIG. 4 is a flow diagram of an exemplary method of forming a joint between the liquid fuel injection spoke and liquid manifold.

The presently disclosed liquid fuel injection spoke 24 may be utilized to form an improved joint between liquid fuel injection spoke 24 and manifold 26. For example, as shown in FIG. 4, a method of forming an improved joint between liquid fuel injection spoke 24 and manifold 26 is disclosed. As shown at step 100, liquid fuel injection spoke 24 may be positioned within manifold 26 to extend into swirler 22. At step 110, first swager 50 may be inserted into cavity 36. First swager 50 may be urged into cavity 36 such that engagement portion 58, i.e. an outer side wall of first swager 50 interacts with surface 46a of protrusion 46 so as to progressively deform or displace material of protrusion 46 as semi-spherical swager die 56 is advanced. Due to the applied pressure, a first amount of molecular diffusion may be induced between liquid fuel injection spoke 24 and manifold 26 after which first swager 50 may be removed from cavity 36.

At step 120, second swager 52, having a larger diameter than first swager 50, may be inserted into cavity 36. Similar to first swager 50 applied in step 110, second swager 52 may be urged into cavity 36 such that engagement portion 59, i.e. outer side wall of second swager 52 interacts with surface 46a of protrusion 46 so as to progressively deform or displace material of protrusion 46 as semi-spherical swager die 57 is advanced. Indeed, material displaced from protrusion 46 may be urged into recess 26a of manifold. Due to the applied pressure, a second amount of molecular diffusion may be induced between liquid fuel injection spoke 24 and manifold 26 after which second swager 52 may be removed from cavity 36. Optionally, heat may be applied to liquid fuel injection spoke 24 and/or manifold 26 at step 130 so as to enhance molecular diffusion therebetween. For example, heat may be applied in any conventional manner, such as, by increasing a temperature of the liquid fuel injection spoke 24 and/or manifold via applied radiation in a vacuum furnace.

As such, an improved joint between liquid fuel injection spoke 24 and manifold 26 may be formed. The improved joint may prevent fuel leakage between liquid fuel injection spoke 24 and manifold 26 and reduce stress cracking. Molecular diffusion between liquid fuel injection spoke 24 and manifold 26 form a strong bond therebetween and the system and method prevent interference with fluid passageway 36.

It will be apparent to those skilled in the art that various modifications and variations can be made to the disclosed liquid fuel injection spoke joint. For example, liquid fuel injection spoke 24 can be securely coupled to the manifold 26 using just a single swager 50, rather than two swagers 50, 52 disclosed above. Further, liquid fuel injection spoke 24 may be secured to manifold 26 without the application of heat. Other embodiments will be apparent to those skilled in the art from consideration of the specification and practice of the disclosed liquid fuel injection spoke joint. It is intended that the specification and examples be considered as exemplary only, with a true scope being indicated by the following claims and their equivalents.

What is claimed is:

1. A liquid fuel injection spoke for a gas turbine engine, comprising:
    an inlet end;
    an outlet end;
    a head located at the inlet end; and
    a stem extending along a longitudinal axis from the head to the outlet end, the stem having a fluid passageway therein, wherein
        the head includes a cavity extending from a proximal end of the head to a distal end of the head, the distal end of the head being adjacent to the stem,
        the cavity has an inner wall including an annular protrusion disposed between and axially separated from the proximal end and the distal end, and
        the cavity forms an inlet to the fluid passageway.

2. The liquid fuel injection spoke of claim 1, wherein the annular protrusion includes a first tapered surface inclined relative to the longitudinal axis.

3. The liquid fuel injection spoke of claim 2, wherein the annular protrusion further includes a flat longitudinally extending surface between the first tapered surface and a second tapered surface, the second tapered surface mirroring the first tapered surface.

4. The liquid fuel injection spoke of claim 1, wherein the cavity is generally cylindrical in shape and radially larger than the fluid passageway.

5. The liquid fuel injection spoke of claim 1, wherein the head includes an outer wall, the outer wall including a recess therein.

6. The liquid fuel injection spoke of claim 5, wherein the annular protrusion is positioned proximally of the recess.

7. The liquid fuel injection spoke of claim 1, wherein the head is generally cylindrical.

8. The liquid fuel injection spoke of claim 1, wherein an outer diameter of the head is larger than an outer diameter of the stem.

9. The liquid fuel injection spoke of claim 1, wherein the annular protrusion is positioned on the inner wall at a location closer to the proximal end than the distal end.

10. A fuel injector system, comprising:
    a liquid fuel injection spoke defining a fluid passageway therethrough, the liquid fuel injection spoke including:
        an inlet end;
        an outlet end;
        a stem extending to the outlet end; and
        a head located at the inlet end, the head including an inner wall extending from a proximal end to a distal end disposed adjacent the stem, the inner wall having an annular protrusion disposed between and axially separated from the proximal end and the distal end.

11. The fuel injector system of claim 10, further including:
a fluid manifold in communication with the fluid passageway, the fluid manifold including a recess therein configured to receive the annular protrusion therein.

12. The fuel injector system of claim 11, wherein the liquid fuel injection spoke and fluid manifold are bonded via molecular diffusion adjoining the annular protrusion within the recess.

13. The fuel injector system of claim 10, wherein the stem extends along a longitudinal axis and defines the fluid passageway therein, the head includes a generally cylindrical cavity, and wherein a diameter of the cavity is larger than a diameter of the fluid passageway.

14. The fuel injector system of claim 10, wherein the annular protrusion includes a first tapered surface inclined relative to a longitudinal axis and a flat longitudinally extending surface between the first tapered surface and a second tapered surface, the second tapered surface mirroring the first tapered surface.

* * * * *